United States Patent [19]

Martin et al.

[11] Patent Number: 5,599,429
[45] Date of Patent: Feb. 4, 1997

[54] WATER DISTILLATION SYSTEM

[75] Inventors: David L. Martin; Robert C. Martin, both of Lincoln, Nebr.

[73] Assignee: Martinstill Corporation, Lincoln, Nebr.

[21] Appl. No.: 214,359

[22] Filed: Mar. 16, 1994

[51] Int. Cl.⁶ .............................. B01D 1/28; B01D 3/42; C02F 1/04
[52] U.S. Cl. .......................... 202/176; 159/24.1; 159/44; 159/46; 202/180; 203/4; 203/10; 203/24; 203/100
[58] Field of Search .................................. 202/180, 177, 202/176, 181, 83, 196, 193, 179; 159/24.2, 46, 44, 24.1; 203/100, 10, 4, 27, DIG. 8, 24; 95/254; 96/155, 157

[56] References Cited

U.S. PATENT DOCUMENTS

| | | | |
|---|---|---|---|
| 2,389,789 | 11/1945 | Latham, Jr. | 230/24 |
| 2,619,453 | 11/1952 | Andersen | 203/24 |
| 2,637,684 | 5/1953 | Buffum | 202/177 |
| 2,760,919 | 8/1956 | Latham, Jr. | 203/24 |
| 2,885,328 | 5/1959 | Williamson | 203/24 |
| 3,245,883 | 4/1966 | Loebel | 203/24 |
| 3,832,289 | 8/1974 | Kays et al. | 159/46 |
| 4,252,616 | 2/1981 | Glazer | 202/177 |
| 4,420,373 | 12/1983 | Egosi | 203/26 |
| 4,698,136 | 10/1987 | El-Allawy | 203/24 |
| 4,778,001 | 10/1988 | Reed | 203/26 |
| 4,814,044 | 3/1989 | Hitt | 202/177 |
| 5,171,455 | 12/1992 | Wang et al. | 203/24 |
| 5,232,556 | 8/1993 | Passarelli | 203/24 |
| 5,312,524 | 5/1994 | Barcomb | 202/177 |

FOREIGN PATENT DOCUMENTS

| | | | |
|---|---|---|---|
| 2506749 | 12/1982 | France | 203/24 |
| 0452087 | 8/1936 | United Kingdom | 202/180 |

*Primary Examiner*—Virginia Manoharan
*Attorney, Agent, or Firm*—Varnum, Riddering, Schmidt & Howlett LLP

[57] ABSTRACT

The water distillation system according to the invention recaptures and utilizes the inherent heat of transformation in converting from the vapor to the liquid states. The water distillation system efficiently removes volatile gases and impurities from the distillate and recaptures and reuses the heat from the impurities. A water seal is created to seal the drive shaft aperture of the compression housing and the rotating drive shaft of the compression rotor. In addition, the compression rotor is assembled of ultra-light, strong member in such a manner to significantly reduce the manufacturing and maintenance costs of the compression rotor drive mechanism.

14 Claims, 4 Drawing Sheets

WATER DISTILLATION SYSTEM

BACKGROUND OF INVENTION

1. File of the Invention

This invention relates to a distillation system and, more particularly, to a compression water distillation system.

2. Description of Related Art

Commercial production of distilled water has increased dramatically to satisfy an ever increasing demand for pure, distilled water. Prior water distillation systems have compressed the distilled water vapor to raise the boiling temperature of the compressed steam above 212° F. The super heated, compressed steam is then passed through a heat exchanger to convey the heat to the source water to be distilled. One problem in the prior water distillation systems is the creation of an effective seal in the compression rotor housing about the rotating drive shaft of the compression rotor to maintain the air-tight integrity of the compression rotor housing. Another significant problem with known water distillation systems is the inefficient use of the inherent heat generated in the water distillation system. As is obvious, the water distillation system will be more efficient by the recapture and recycling of the energy of the venting inherent heat generated during the water distillation process.

SUMMARY OF INVENTION

The water distillation system according to the invention overcomes the problems of the prior art water distillation systems in that it recaptures and recycles more inherent heat generated by the water distillation system, thereby creating a more efficient and cost effective water distillation system. In addition, the water distillation system according to the invention includes an improved compression rotor assembly and drive mechanism which reduces the manufacturing and maintenance costs for the drive mechanism by utilizing components which need not be accurately balanced or highly machined. In addition, the compression rotor drive mechanism according to the invention includes a low cost, highly effective seal to maintain the air-tight integrity of the compression rotor housing about the rotating drive shaft of the compression rotor.

The water distillation system according to the invention comprises a preheater having a source water inlet, a preheated water outlet and a heat exchanger mounted therein wherein the preheater heats incoming source water. The water distillation system also includes an evaporator having a preheated water inlet, an evaporation chamber and a heat exchanger mounted therein wherein the evaporator converts the preheated source water into water vapor and volatile gases. An evaporator volatile gas outlet is formed in the heat exchanger chamber of the evaporator. A preheater volatile gas inlet is formed in the preheater wherein the gas inlet is located below the water level in the preheater during normal operation of the distillation system. A gas conduit having one end mounted to the evaporator volatile gas outlet and the other end mounted to the preheater volatile gas inlet creates a fluid conduit between the evaporator chamber and the preheater. The gas entering the preheater through the gas conduit will pass through the water in the preheater, will give up heat in the gas to the preheater water and the water vapor passing through the gas conduit will give up its latent heat to the preheater water and revert to the liquid state.

In another aspect, the invention comprises a compression rotor apparatus for use in compressing gases comprising a compression rotor housing having an inlet, an outlet and a drive shaft aperture. A compression rotor is rotatively mounted in the compression rotor housing. A drive motor has a drive shaft extending therefrom and the drive shaft extends through the drive shaft aperture into the compression rotor housing. A fluid seal is formed between the compression rotor housing and the drive shaft to prevent the flow of gases into and out of the compression rotor housing through the drive shaft aperture.

In yet another aspect, the invention comprises an improved compression rotor apparatus for use in compressing gases comprising a compression rotor member mounted to the drive shaft of a drive motor. The compression rotor member comprises first and second compression rotor plates wherein each plate has a plurality of retaining tab apertures formed therein. A plurality of fin members having retaining tabs extending outwardly from the top and bottom edges thereof are mounted to the two plates such that the retaining tabs of the fin members extend through the retaining tab apertures. A plurality of fin retaining members having a plurality of mounting tab apertures formed therein are mounted to the fin members such that the retaining tabs extend through the mounting tab apertures.

In still another aspect, the invention comprises a water distillation system comprising a preheater having multiple chambers formed therein. The preheater comprises a source water inlet, a source water outlet, at least one thermally conductive flow conduit extending between the inlet and outlet and a pure water heat exchange chamber having a portion of the plurality of flow conduits extending therethrough. A plurality of flow conduits also extend through a wastewater heat exchange chamber formed in the preheater. An evaporator comprises an evaporation chamber, a source of heat and a primary heat exchange chamber received inside the evaporation chamber.

In another aspect of the invention, the invention comprises a water distillation system comprising a preheater having a source water inlet, a source water outlet, a plurality of thermally conductive flow conduits extending between the inlet and outlet and a heat exchange chamber having the plurality of flow conduits extending therethrough. An evaporator comprises an evaporation chamber, a source of heat and a primary heat exchange chamber received inside the evaporation chamber. The primary heat exchange chamber has a first side wall and a second side wall wherein the second side wall is taller than the first. A top wall extends between the side walls and a plurality of flow conduits extend between the first and second side walls. The source water to be converted to steam is received in the evaporation chamber, some of which is converted to steam. The primary heat exchange chamber receives the steam generated in the evaporation chamber.

BRIEF DESCRIPTION OF THE DRAWINGS

The invention will now be described with reference to the drawings wherein.

DESCRIPTION OF THE PREFERRED EMBODIMENTS

Figure 1:
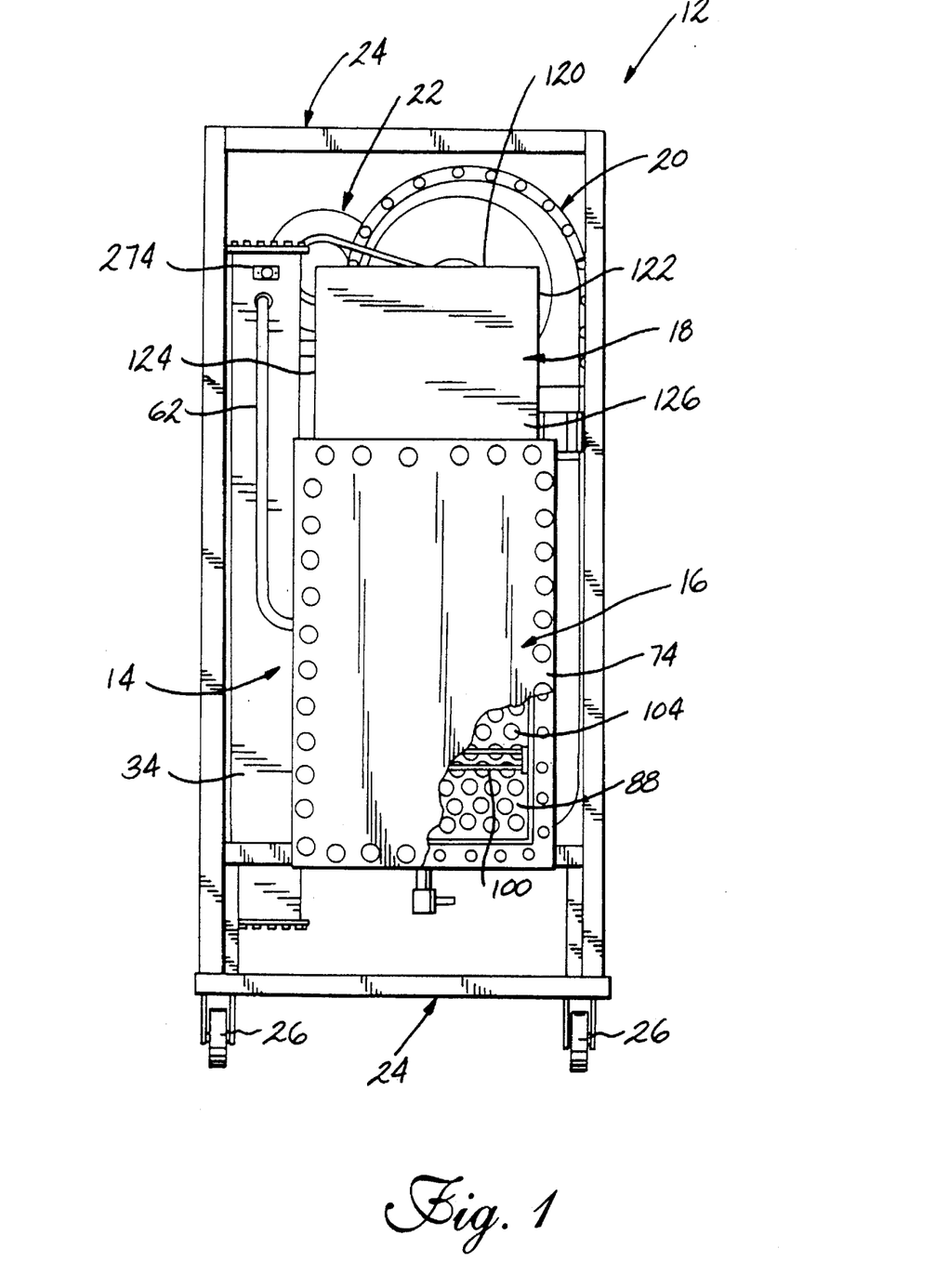
FIG. 1 is a front elevational view of the water distillation system according to the invention.

Referring now to the drawings and to FIG. 1 in particular, a water purification system 12 according to the invention is shown. The water purification system 12 comprises a preheater 14, an evaporator 16 in fluid communication with the preheater 14, a baffle chamber 18 mounted to the evaporator, a compression rotor housing 20 in fluid communication with the baffle chamber 18 and a drive motor 22 to rotate the rotor inside the compression rotor housing 20. The water purification system 12 is mounted within a conventional frame 24 which is in turn supported by caster wheels 26 thereby making the water purification system 12 mobile. In the preferred embodiment, exterior panels are secured to the frame 24 to enclose the water purification system 12 and the heated units are wrapped in conventional insulation. However, the panels and insulation are not depicted in the enclosed drawings for purposes of clarity.

Figure 2:
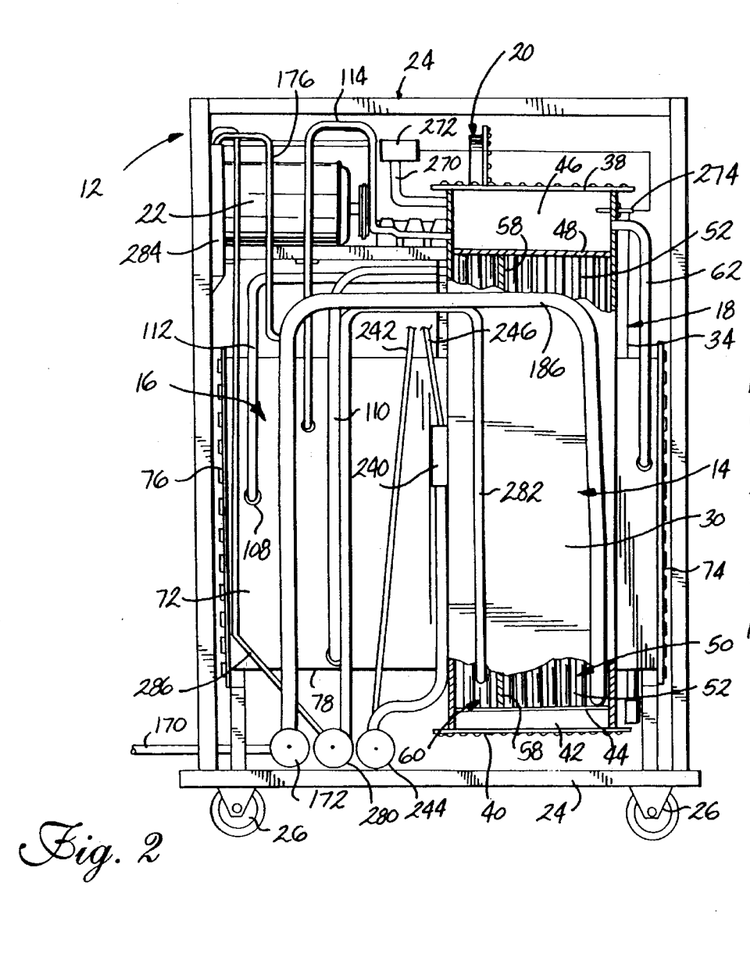
FIG. 2 is a left side elevational view of the water distillation system of FIG. 1.

As seen in FIGS. 1 and 2, the preheater 14 comprises a front wall 30, a rear wall 32 (FIG. 3), a pair of opposed side walls 34, 36, a top wall 38 and a bottom wall 40. The interior of the preheater is separated into multiple chambers. Formed in the bottom of the preheater 14 is an inlet chamber 42 defined by the bottom wall 40, side walls 34, 36, front wall 30, rear wall 32 and an inlet chamber panel 44 which extends between the front and rear walls 30, 32 and the opposed side walls 34, 36. Formed in the top portion of the preheater is an outlet chamber 46 which is defined by the front, rear, side and top walls 30, 32, 34, 36, 38 of the preheater and an outlet chamber panel 48 which extends between the opposed front and rear walls 30, 32 and the opposed side walls 34, 36. A preheat exchange chamber 50 is formed between the inlet chamber panel 44 and the outlet chamber panel 48. The preheat exchange chamber 50 is sealed with respect to the inlet and outlet chambers 42, 46 such that no fluid can enter the preheat exchange chamber 50 from the inlet and outlet chambers 42, 46. However, the inlet and outlet chambers 42, 46 are interconnected by a plurality of heat exchange conduits 52 which extend from the inlet chamber panel 44 to the outlet chamber panel 48. Preferably, the heat exchange conduits 52 comprise a plurality of stainless steel tubes which are welded at the top and bottom thereof to the inlet and outlet chamber panels 44, 48 which are also preferably formed of stainless steel.

A wastewater chamber panel 58 also extends between the inlet and outlet chamber panels 44, 48 to create a wastewater heat exchange chamber 60 within the preheat exchange chamber 50. Preferably, the wastewater chamber panel 58 is L-shaped to define the wastewater heat exchange chamber 60 which is substantially rectangular in cross section as defined by the wastewater chamber panel 58 and the front and side wall 30, 34. The wastewater heat exchange chamber 60 comprises only a small portion of the heat exchange area between the inlet and outlet chamber panels 44, 48 in the preheater 14.

Figure 3:
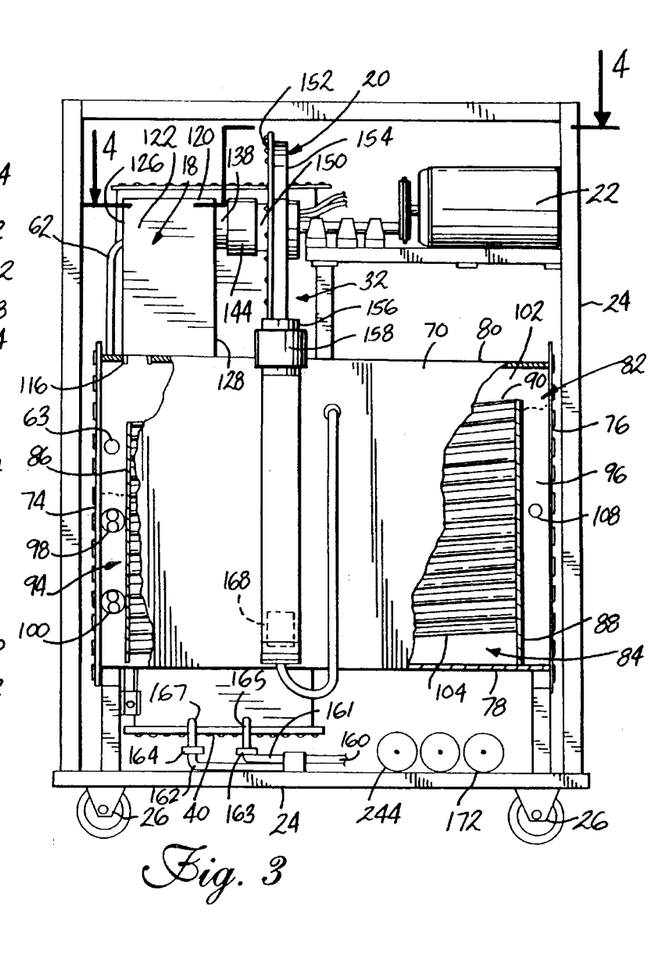
FIG. 3 is a right side elevational view of the water distillation system of FIG. 1.

A gravity feed outlet conduit 62 extends from the outlet chamber 46 of the preheater 14 to the evaporator 16. As seen in FIG. 3, the evaporator 16 comprises a front wall 70, a rear wall 72, a pair of opposed side walls 74, 76, a bottom wall 78 and a top wall 80. Preferably, the several walls of the evaporator 16 are formed of stainless steel and the side walls 74, 76 are removably mounted to the securely mounted other walls by conventional fasteners.

The inside of the evaporator 16 is subdivided into multiple chambers. Namely, an evaporation chamber 82 and a primary heat exchange chamber 84. The primary heat exchange chamber 84 is defined by a pair of opposed internal side walls 86, 88, a sloped top wall 90, the front and rear walls 70, 72 and the bottom wall 78 of the evaporator 16. The internal side walls 86, 88 and top wall 90 are mounted to the bottom wall 78 of the evaporator and to each other such that the primary heat exchange chamber 84 is sealed from the evaporation chamber 82.

As seen in FIG. 3, the internal side wall 88 is slightly taller in height than the internal side wall 86. Therefore, the top wall 90 which extends between the upper edges of the side walls 86, 88 is sloped. Preferably, this slope is an angle of approximately 6° with respect to the horizontal plane.

The primary heat exchange chamber 84 is mounted within the evaporation chamber 82 to create an inlet header chamber 94 at the lower end of the primary heat exchange chamber 84 and an outlet header chamber 96 at the higher end of the primary heat exchange chamber 84. The inlet header chamber 94 is defined by the internal side wall 86 and the front, rear, side and bottom walls 70, 72, 74 and 78 of the evaporator. Water from the preheater outlet chamber 46 is supplied to the inlet header chamber 94 through the outlet conduit 62 which is mounted to a water inlet 63. Received within the inlet header chamber 94 are a conventional primary heating element 98 and a secondary heating element 100.

The outlet header chamber 96 is defined by the internal side wall 88 and the front, rear, side and bottom walls 70, 72, 76 and 78 of the evaporator. The inlet and outlet header chambers 94, 96 are in fluid communication with one another through the air space 102 above the primary heat exchange chamber 84 which is defined by the front, rear, side and top walls 70, 72, 74, 76 and 80 of the evaporator 16 and the sloped top wall 90 of the primary heat exchange chamber 84. The inlet and outlet header chambers 94, 96 are also in fluid communication through a plurality of heat exchange conduits 104 which extend between the two internal side walls 86, 88. Preferably, the heat exchange conduits 104 comprise lengths of stainless steel tubing welded to the stainless steel internal side walls 86, 88. While the heat exchange conduits 104 extend through the primary heat exchange chamber 84, they are sealed with respect to the interior of the chamber to prevent fluid communication therebetween.

Figure 4:
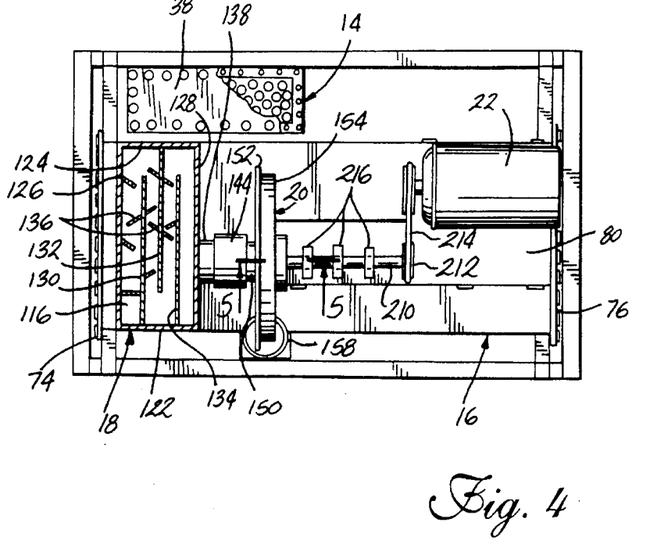
FIG. 4 is a top plan view of the water distillation system of FIG. 1 with the top wall of the baffle chamber broken away to show the internal baffle panels.

A steam conduit 116 is mounted to the top wall 80 of the evaporator and supplies steam generated within the evaporation chamber 82 to the baffle chamber 18. As seen in FIGS. 3 and 4, the baffle chamber 18 comprises a top wall 120, front wall 122, rear wall 124 and a pair of opposed side walls 126, 128. A plurality of vertically oriented baffle panels 130, 132, 134 are mounted in the baffle chamber 18 and extend between the top wall 120 and the bottom of the baffle chamber 18. A plurality of turbulence members 136 extend outwardly from the baffle panels 130, 132, 134 into the space between the baffle panels to further disrupt the flow of steam through the baffle chamber. The structure of the baffle panels and turbulence members 136 within the baffle chamber 18 creates a tortuous path for the steam through the baffle chamber 18.

Figure 5:
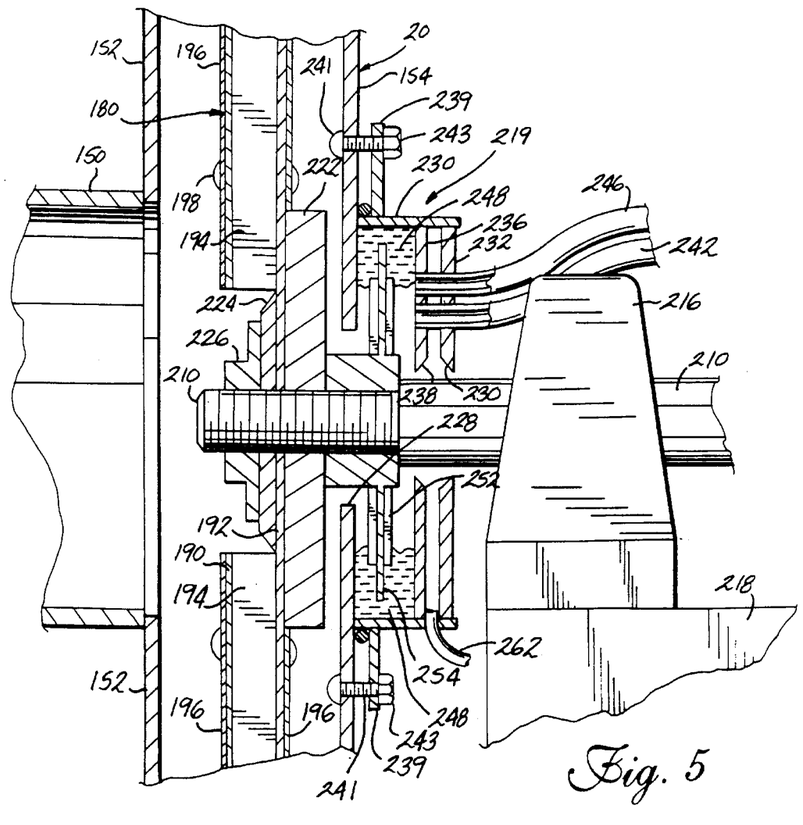
FIG. 5 is a sectional view of the rotor housing and seal mechanism of the water distillation system according to the invention taken along lines 5—5 of FIG. 4.

An outlet conduit 138 is formed on the opposite side of the baffle chamber 120 from the steam conduit 116. One end of a flexible conduit 144 is securely mounted to the outlet conduit 138. The other end of the flexible conduit 144 is mounted to an inlet conduit 150 of the compression rotor housing 20. The compression rotor housing 20 comprises a clam-shell assembly formed of a first and second housing members 152, 154 (FIG. 5). The inlet conduit 150 is formed in the first housing member 152 to receive steam from the baffle chamber 18 and flexible conduit 144. As will be described in greater detail below, a rotor rotates within the compression rotor housing and compresses the steam and forces the steam out of the compression rotor housing 20 through an outlet conduit 156. The outlet conduit 156 receives one end of a flexible conduit 158. The other end of the flexible conduit 158 is received on the upper end of the primary heat exchange steam conduit 166. The primary heat exchange steam conduit 166 extends downwardly along the front wall 70 of the evaporator 16 to the base of the evaporator 16 and the primary heat exchange chamber 84. A steam inlet aperture 168 is formed in the front wall 70 of the evaporator 16 and receives compressed steam from the compression rotor housing 20 through the flexible conduit 158 and primary heat exchange steam conduit 166.

A condensate outlet conduit 110 is formed in the rear wall 72 of the evaporator 16. The conduit 110 conveys condensed, distilled water from the base of the primary heat exchange chamber 84 to the preheat exchange chamber 50 of the preheater 14. A wastewater conduit 112 is mounted to a wastewater outlet 108 in the outlet header chamber 96 of the evaporation chamber 82 to convey wastewater from the evaporation chamber 82 to the wastewater heat exchange chamber 60 of the preheater 14. A volatile gas conduit 114 extends from an outlet formed in the rear wall 72 of the evaporator 16 and conveys steam and entrapped volatile gases from the primary heat exchange chamber 84 to the outlet chamber 46 of the preheater 14.

In operation, water from an outside source is supplied to the water purification system 12 through a source water conduit 160. As seen in FIG. 3, the source water supply conduit 160 is split into two sub-conduits 161, 162, each of which terminate at a conventional solenoid valve 163, 164. Each of the solenoid valves is interconnected to the inlet chamber 42 of the preheater 14 through suitable conduits 165, 167. Preferably, the solenoid valves 163, 164 are ⅛ inch orifice valves which, for a 1,500 gallon per day system such as that shown in the drawings, is a relatively small valve opening. However, the opening and closing of the solenoid valves 163, 164 is controlled by a conventional controller (not shown) and sensor (not shown) mounted downstream in the system to maintain the slow, nearly consistent supply of source water to the system. Through the use of a slow, continuous supply, large disruptions of the temperature environment inside the system can be avoided. Typically, the two solenoid valves 163, 164 will only be opened during the initial start-up of filling the unit and in the event of an unusually low water pressure from the incoming source line 160. Under normal operating conditions, only one valve would be selectively opened to continuously feed the source water to the system. Typically, the temperature of the incoming source water will be approximately 50°–60° F.

The source water in the inlet chamber 42 will flow from the inlet chamber 42 to the outlet chamber 46 through the heat exchange conduits 52. As the water flows through the heat exchange conduits 52, the source water will absorb heat from the heated, condensed, distilled water which is supplied to the preheat exchange chamber 50 from the primary heat exchange chamber 84, as described below. The source water will also absorb heat from the wastewater which is supplied to the wastewater heat exchange chamber 60 from the evaporation chamber 82, as described below. The source water flowing through the heat exchange conduits 52 which extend through the wastewater heat exchange chamber 60 and the preheat exchange chamber 50 will absorb sufficient heat to raise the temperature of the source water to approximately 210°–216° F. when the water reaches the outlet chamber 46.

Obtaining the unusually high source water temperature in the outlet chamber 46 is achieved through the recapture of heat from the volatile gases and entrapped steam which are vented from the evaporator 16. As described more fully below, hot volatile gases and entrapped steam are vented from the evaporator to a point in the outlet chamber 46, which is below the water level under normal operating conditions. The gases will give up some of their heat to the water in the outlet chamber as it percolates upwardly through the outlet chamber 46. More importantly, the entrapped steam will condense inside the outlet chamber and the latent heat which is given up during this phase change is sufficient to raise the temperature of the water in the preheater to an unexpectedly high level.

As seen in FIG. 2, the gravity feed outlet conduit 62 is mounted to an outlet in the side wall 34 of the outlet chamber 46 of the preheater 14. Therefore, when the level of source water within the outlet chamber 46 reaches the outlet of the gravity feed outlet conduit 62, the preheated source water will flow from the outlet chamber 46 to the inlet header chamber 94 of the evaporator 16. The water flowing into the inlet header chamber 94 will be at a temperature of approximately 210° F.

As the preheated source water enters the inlet header chamber 94, it will encounter the primary and secondary heating elements 98, 100 which will provide an additional source of heat to raise the temperature of the source water. The heating elements are conventional resistance elements which receive electrical current from a suitable source (not shown). During normal operating conditions, only approximately 2–10% of the energy necessary to sustain the distillation process is supplied by the heating elements 98, 100. The bulk of the energy for running the system is supplied through the recapture of the latent heat given off during the condensation of the steam to distilled water. As seen in FIG. 3, the water level of the heated source water within the inlet header chamber 94 will extend at least halfway up the height of the internal side wall 86 during normal operating conditions. As the heated source water encounters the primary and secondary heating elements 98, 100, the water will transform, in part, to steam. As the heated water expands to the vapor stage, the expanding vapor and heated water will pass through the heat exchange conduits 104 to the outlet header chamber 96. As the heated source water and steam passes through the heat exchange conduits 104, additional heat is provided to the source water from the compressed steam supplied to the primary heat exchange chamber 84, as described below. The additional heat infused into the heated source water converts more of the source water into steam such that a mixture of steam and water pass out of the heat exchange conduits 104 into the outlet header chamber 96. The steam produced will bubble up through the water in the outlet header chamber into the air space 102 above the primary heat exchange chamber 84.

The source water which has passed through the heat exchange conduits 104 and which has not yet been converted to steam will collect in the outlet header chamber 96 until the water level within the outlet header chamber 96 reaches the sloped top wall 90. Once the unconverted source water reaches this level, the overflow water will flow from the outlet header chamber 96 across the sloped top wall 90 to the inlet header chamber 94, thereby recirculating the unconverted source water to the inlet header chamber. The water received in the inlet header chamber 94 will again encounter the heating elements 98, 100 and, more importantly, will be subjected to the heat given up in the primary heat exchange chamber 84 by the compressed steam.

The steam in the air space 102 of the evaporation chamber 82 will pass through the steam outlet 116 into the baffle chamber 18. The steam entering the baffle chamber 18 will likely include microscopic water droplets containing impurities from the source water. In distilled water, it is obviously desirable to eliminate such impurities. The baffle chamber 18 provides a tortuous path through which the steam and water droplets must pass and a large amount of surface area upon which the entrapped water droplets can be collected and removed from the purified steam. As seen in FIG. 4, the vertically oriented baffle panels 130, 132, 134 define a tortuous zig-zag path through which the steam and water droplets must pass. In addition, the turbulence members 136 which project into the space between adjacent baffle panels further disrupts the flow of steam therethrough and causes the steam to impinge upon the various surface areas of the baffle chamber to remove the water droplet impurities. Once the steam reaches the outlet conduit 138, the vast majority of water droplets have been removed from the purified steam. The water droplets are collected at the base of the baffle chamber and are returned to the evaporator 16.

A basic principal of the physical chemistry of water and steam is that compressed or pressurized steam will have a higher boiling temperature than steam at atmospheric pressure. Therefore, in order to extract a large amount of energy from the purified steam as it converts from the vapor stage back to the liquid stage, the purified steam is compressed slightly inside the compression rotor housing 20. As seen in FIGS. 4 and 5, steam is received in the compression rotor housing 20 through the flexible conduit 144. The steam engages the compression rotor member 180 which is rotating at approximately 7,800–8,000 RPM's. The rotation of the compression rotor member 180 will compress the steam entering the compression rotor housing 20 to approximately 1.2 pounds per square inch above the pressure within the evaporation chamber which is typically under a slight positive pressure.

The compressed steam flows out of the compression rotor housing 20 through the outlet conduit 156 and flexible conduit 158, through the primary heat exchange steam conduit 166 into the primary heat exchange chamber 84. The steam inlet aperture 168 is spaced upwardly from the bottom wall 78 of the evaporator, thereby creating a condensate catch basin 182 (FIG. 3) at the base of the primary heat exchange steam conduit 166. Any entrapped water droplet impurities which were not removed from the purified steam in the baffle chamber 18 will be removed from the steam as a result of the compression applied to the steam by the compression rotor member 180. The impure water droplets will collect in the catch basin 182 and will be conveyed from the catch basin 182 back to the evaporation chamber 82 through a suitable conduit 184 (FIG. 3). The positive pressure created in the primary heat exchange steam conduit from the rotation of the compression rotor member 180 will force the collected water droplet impurities upwardly through the conduit 184 to the evaporation chamber 82.

As noted above, the steam entering the primary heat exchange chamber 84 is under approximately 1.2 pounds of pressure per square inch above the pressure in the evaporation chamber. Under these conditions, the condensing point of the steam will be elevated to approximately 3° F. above the boiling temperature of the water in the evaporation chamber. The heated source water which is passing through the heat exchange conduits 104 of the primary heat exchange chamber 84 will be cooler than the compressed steam and, therefore, will extract heat therefrom through the sidewalls of the thermally conductive heat exchange conduits 104. As the compressed steam gives up its latent heat during condensation to the source water inside the conduits, the compressed steam will condense into pure distilled water droplets. The water droplets will drip down into the base of the primary heat exchange chamber 84 and will be conveyed through the condensate outlet conduit 110 (FIG. 2) to the preheat exchange chamber 50 of the preheater 14. As noted above, the primary heat exchange chamber 84 has a slight positive pressure which will be sufficient to force the condensed distilled water from the primary heat exchange chamber 84 upwardly through the condensate outlet conduit 110 to the opening formed at the top of the preheat exchange chamber 50.

The condensed, distilled water entering the preheater 14 through the condensate outlet conduit 110 is at approximately 215° F. when it enters the preheater. As seen in FIG. 2, the water enters at the top of the preheat exchange chamber 50 which, during normal operating conditions, is substantially full of water. Inside the preheat exchange chamber 50, the heated distilled water will give up its heat to the relatively cool source water passing through the heat exchange conduits 52 such that the distilled water exiting the preheat exchange chamber 50 through an outlet conduit is at approximately 100° F. The pure distilled water is removed from the bottom portion of the preheat exchange chamber 50 through the outlet conduit 186. The slight internal pressure inside the preheat exchange chamber 50 will force the water upwardly through the conduit 186 to the top of the conduit 186. Through the force of gravity, the water will flow down the vertical portion of the conduit 186 to the distilled water pump 172. The pump 172 is designed to remove all of the distilled water which is produced by the system. However, it will not create sufficient negative pressure within the conduit 186 to force the removal of distilled water from the system. Rather, the internal pressure conditions inside the preheater and evaporation chamber will control the flow of distilled water through the outlet conduit 186. A vent conduit 176 is attached to the upper portion of the outlet conduit 186 such that if insufficient distilled water has been supplied to the pump 172 to keep up with the pumping conditions, then air will be drawn into the conduit 186 through the vent conduit 176 and thereby prevent the formation of negative pressure within the outlet conduit 186. The water is conveyed to a conventional storage tank from the pump 172 through a distilled water conduit 170.

Figure 7:
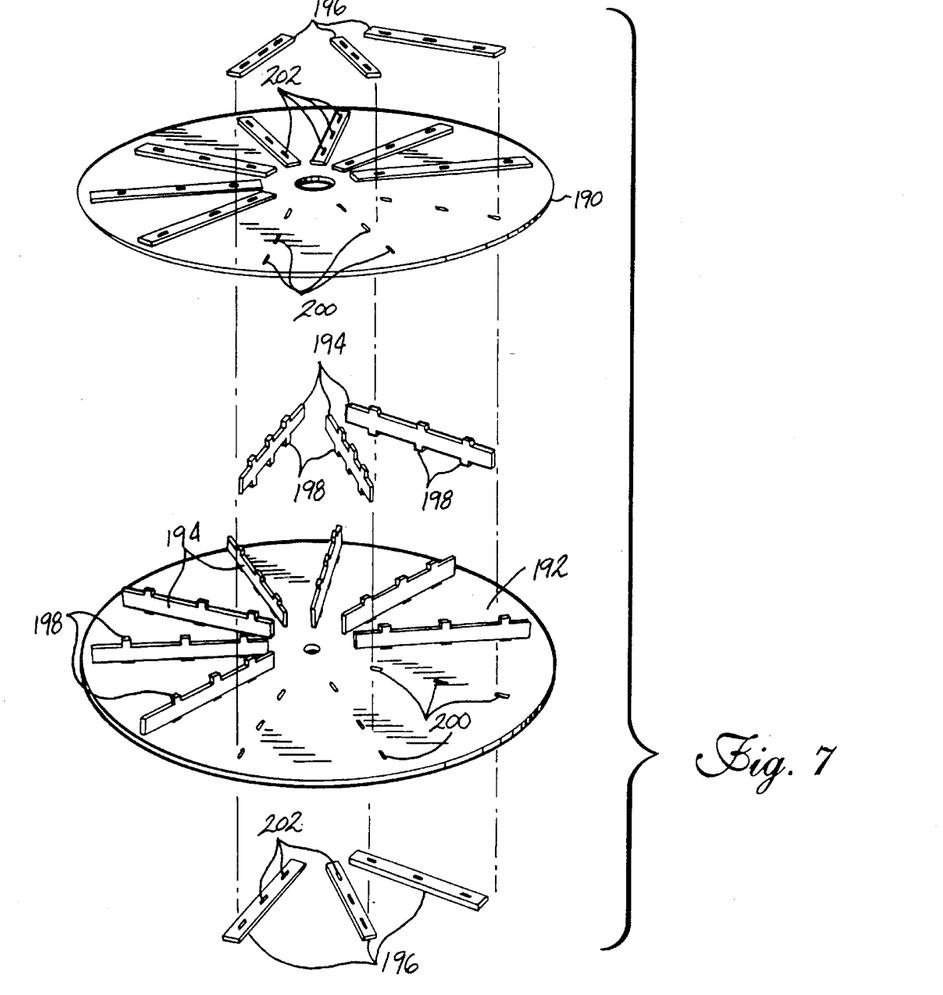
FIG. 7 is an exploded view of the compression rotor member according to the invention.

Efficiently compressing steam in a water purification system has proven to be difficult for prior water distillation systems. The water distillation system according to the invention includes a unique rotor structure which simplifies the assembly and manufacturing thereof. As seen in FIG. 7, the compression rotor member 180 according to the invention comprises a pair of opposed rotor plates 190, 192, a plurality of fin members 194 and a plurality of fin retaining members 196. The rotor plates 190, 192 are preferably formed of an extremely light, strong material such as titanium or a titanium alloy and the fin members 194 and the fin retaining members 196 are preferably formed of stainless steel. The fin members 194 are substantially planar and have a plurality of retaining tabs 198 extending outwardly therefrom. The retaining tabs 198 are received in a plurality of retaining tab apertures 200 formed in the rotor plates 190, 192. The tabs 198 are formed on the top and bottom edges of the fin members 194 and the retaining tab apertures 200 are spaced along the rotor plates 190, 192 to receive the tabs 198. The fin retaining members 196 are substantially planar and have tab receiving apertures 202 spaced along the length thereof which are adapted to receive the retaining tabs 198. The compression rotor member 180 is assembled by mounting the rotor plates 190, 192 to the fin members 194 such that the retaining tabs 198 extend through the retaining tab apertures 200. Next, the fin retaining members 196 are mounted to the outside surface of both of the rotor plates 190, 192 such that the retaining tabs 198 of the fin members 194 extend through the tab receiving apertures 202. Finally, the retaining tabs 198 are welded to the fin retaining members 196 to complete the assembly of the compression rotor member 180.

One advantage of the compression rotor member 180 according to the invention is the creation of an extremely light, yet strong compression rotor member which can be quickly assembled from dissimilar metals such as titanium and stainless steel. As will be described later below, the reduction in weight for the compression rotor dramatically simplifies the structure, maintenance and tolerance requirements for the drive mechanism for the compression rotor 180.

As described above, the rotation of the compression rotor induces a slight positive pressure in the steam which passes through the compression rotor housing 20. In order to maintain the slight positive pressure within the compression rotor housing, it is necessary to seal the compression rotor housing from the outside environment. The rotation of the drive shaft 210 of the compression rotor creates significant problems in creating an effective seal for the compression rotor housing 20. The seal according to the invention is a simple, yet effective, substantially air-tight water seal between the rotating shaft and the compression housing.

As seen in FIGS. 4 and 5, the drive mechanism for the compression rotor member 180 comprises the drive shaft 210 having a drive pulley 212 mounted thereto which receives one end of a drive belt 214. The drive belt 214 is received on the drive motor 22 which imparts the necessary force of rotation to the shaft 210. The shaft 210 is rotatively mounted in a plurality of conventional pillow block bearings 216 which are, in turn, mounted to a bearing mounting block 218. The bearing mounting block 218 acts as a heat sink to dissipate the heat generated by the bearings 216 which thereby prolongs the life of the bearings. In addition, the bearing mounting block 218 can be manufactured such that the side walls of the mounting block are co-extensive with the side walls of the conventional pillow bearings 216. Therefore, when the bearings must be serviced, proper alignment of the bearings can easily be established by lining the side walls of the pillow block bearings 216 with the side walls of the bearing mounting block 218.

The end of the drive shaft 210 opposite the drive motor 22 is preferably a left-handed threaded shaft which receives thereon a water distribution member 220, a rear backing plate 222, the compression rotor member assembly 180, a front backing plate 224 and a locking nut 226. The locking nut 226, front backing plate 224, compression rotor member 180 and rear backing plate 222 are received in the compression rotor housing 20. The shaft 210 extends through a shaft aperture 228 formed in the second housing member 154 into the compression rotor housing to support these elements.

A water seal 219 is formed between the compression rotor housing 20 and the rotating drive shaft 210 and comprises a seal flange 230 which extends outwardly from the second housing member 154. The flange 230 is circular in cross section and concentrically surrounds the drive shaft 210. A first circular plate 232 is mounted to the outside edge of the flange 230 and extends inwardly toward the shaft. The first circular plate 232 has a shaft aperture 228 formed therein which concentrically surrounds the drive shaft. A second circular plate 236 also extends inwardly from the flange 230 a spaced distance between the first circular plate 232 and the second housing member 154. The second circular plate 236 has a drive shaft aperture 238 formed therein which concentrically surrounds the drive shaft 210. The flange 230 and plates 232, 234 are secured to the second housing member 154 by a mounting flange 239 which extends radially outwardly from the tubular shaped flange 230. A plurality of conventional mounting bolts 241 extend through the mounting flange 239 and the second housing member 154 and receives a conventional nut 243 thereon.

In the assembled state, the water distribution member 220 is mounted to the drive shaft 210 and received in the seal 219 defined by the second circular plate 236, the flange 230 and the second housing member 154. As seen in FIGS. 2 and 5, the water distribution member 220 is adapted to receive water from a seal water reservoir 240. The seal water reservoir 240 contains a supply of water which is pumped through a water tube 242 by a water pump 244. The water supply tube 242 passes through the first and second circular plates 232, 236 and terminates at a point immediately adjacent to the water distribution member 220. The supply water passing through the water supply tube 242 is directed at the water distribution member 220 which is rotating with the drive shaft 210 at approximately 7,800–8,000 RPM's. When the water strikes the water distribution member 220, the water is thrown radially outwardly as a result of contact with the water distribution member 220. The water collects in the seal 219 defined by the second housing member 154, the flange 230 and the second circular plate 236. A water drainage tube 246 is mounted in the second circular plate 236 a spaced distance from the flange 230. Excess water within the seal 219 is drained therefrom through the water drainage tube 246. The drainage tube 246 returns the excess water to the reservoir 240. Experimentation has shown that supplying water to the seal 219 from the water pump 244 at a rate of approximately 0.125 gallons per minute creates a sufficient flow of water into and out of the seal 219 to effectively seal the drive shaft aperture 228 of the compression rotor housing.

The consistent flow of water into and out of the seal 219 through the water supply tube 242 and water drainage tube 246 has significant advantages. First, the water within the seal 219 is relatively cool because it is not in contact with the hot steam inside the compression rotor housing 20 for any significant period of time. Therefore, this prevents evaporation of the sealing water and also keeps the components of the seal in which it contacts relatively cool. Secondly, the consistent supply and removal of water to the seal 219 allows for a relatively large spacing between the water distribution member 220 and the flange 230, second housing member 154 and second circular plate 236. With this relatively large spacing between these members, alignment of the drive shaft and these several elements is not critical, thereby reducing the costs of maintenance and installation.

Figure 6:
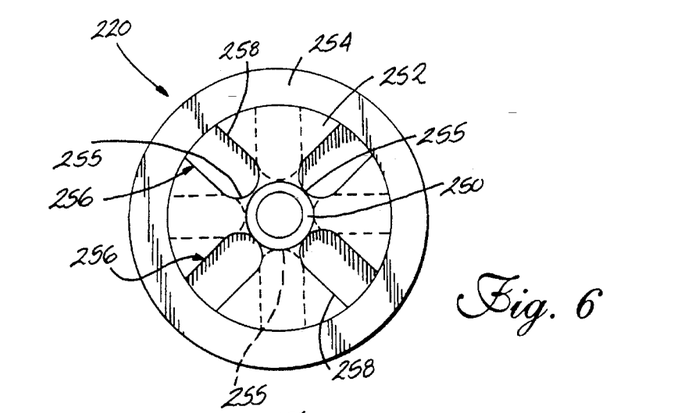
FIG. 6 is a top plan view of the water distribution member of the water seal mechanism according to the invention.

As seen in FIG. 6, the water distribution member 220 comprises a central mounting hub 250, an intermediate body portion 252 and a tapered outer portion 254. The intermediate body portion 252 has a plurality of U-shaped recesses 256 formed therein. The recesses are formed in the intermediate body portion 252 such that the spray of water from the water supply tube 242 will be received adjacent the bight portion 255 of the U-shaped recess 256. The side walls 258 of the U-shaped recess create a surface, during rotation which engages the water and drives it radially outwardly. The U-shaped recesses 256 are formed on both sides of the intermediate body portion 252 of the water distribution member 220. The spacing of the U-shaped recesses 256 on the opposite sides of the intermediate body portion 252 are staggered to avoid the creation of a thin, weak portion in the water distribution member 220.

As seen in FIG. 5, a portion of the intermediate body portion 252 is received in the water 248 of the seal 219 during normal operation of the compression rotor. All of the exposed portion of the tapered outer portion 254 of the water distribution member 220 is also received in the water 248 of the seal 219. The tapered outer portion 254 creates a smooth surface to rotate through the water seal and prevent the creation of undue turbulence therein.

In operation, steam enters the compression rotor housing 20 through the inlet conduit 150 and the compression rotor member 180 rotates with the drive shaft 210 to increase the pressure within the compression rotor housing 20. Any pressurized steam which passes through the drive shaft aperture 228 in the second housing member 154 will engage the rotating water distribution member 220 and, more importantly, the water 248 retained in the seal 219. The relative pressure of the steam inside the compression rotor housing 20 is not great enough to displace the water in the seal 219. Therefore, the substantially air-tight integrity of the compression rotor housing 20 is maintained and the bearings 216 supporting the drive shaft 210 are shielded from the harsh environment of the compressed steam in the compression rotor housing 20.

Any water 248 which may inadvertently escape from the seal will most likely be captured between the first and second circular plates 232, 236 and the flange 230. A drainage conduit 262 is mounted to the flange 230 at the lowest point thereof such that the water is returned to the seal water reservoir 240 through the force of gravity. In the preferred embodiment, an O-ring 264 is mounted at the junction between the flange 230, the second housing member 154 and the mounting flange 239 to maintain the water-tight integrity of the seal 219.

Another significant problem with prior compression rotor drive mechanisms has been obtaining and maintaining the proper alignment of the drive shaft with respect to the rotor. In light of the relatively high speed of rotation of the shaft and rotor, a slight imbalance or misalignment of these members could result in severe damage to the drive assembly. In addition, it is also desirable to utilize a drive shaft having the smallest possible diameter to reduce the wear on the bearings. In using the relatively lightweight compression rotor member 180 described above, it was found that a drive shaft of significantly reduced diameter could be used in the drive mechanism for the compression rotor.

It is known to use two pillow block bearings for the drive shaft of a compression rotor, one being adjacent to the drive shaft pulley and the other being as close as possible to the compression rotor member. However, when a reduced diameter drive shaft is used, the rotor must be critically balanced, otherwise a significant amount of flex will develop in the length of the drive shaft between the two pillow block bearings. To overcome this problem, the drive mechanism for the compression rotor according to the invention mounts a third pillow block bearing 216 between the two conventionally known bearings. The use of this third pillow block bearing has resulted in significant advantages. First, a smaller diameter drive shaft can be used. Second, there is no need to use a critically balanced rotor. Rather, a rotor assembly such as that described above can be used. This results in significant cost savings in machining and maintenance of the drive mechanism.

The water purification system according to the invention also provides means to continuously remove wastewater from the system and thereby prevent excessive build-up of solids and impurities in the system. As seen in FIG. 2, the wastewater conduit 112 is mounted to a wastewater outlet 108 in the outlet header chamber 96. The wastewater conduit 112 is mounted to the preheater 14 such that the wastewater forced from the outlet header chamber 96 is conveyed to the wastewater heat exchange chamber 60 of the preheater 14. The heated wastewater transfers its internal heat to the cooler source water which is passing through the heat exchange conduits 52 of the preheater 14. The wastewater is forced from the outlet header chamber 96 upwardly through the wastewater conduit 112 to the top of the wastewater heat exchange chamber 60 as a result of the positive pressure within the evaporation chamber.

A conduit 282 is mounted at the bottom of the wastewater heat exchange chamber 60 and receives the cooled wastewater and conveys it to a wastewater pump 280. The conduit 282 extends upwardly from the bottom of the wastewater heat exchange chamber 60 and the wastewater is forced upwardly through the conduit as a function of the water level inside the wastewater heat exchange chamber 60. When the water level reaches the uppermost point of the conduit 282, the water will flow, through the force of gravity, to the wastewater pump 280 which will convey the water to the drain 284 through a suitable conduit 286. Once again, the wastewater pump 280 is designed to convey all water transferred to the pump, but will not create a negative pressure within the conduit 282. In addition, the pump 280 is designed to have an upper capacity limit which will prevent the removal of an excess amount of wastewater from the system. By continually removing water from the outlet header chamber 96, the build-up of solids and other foreign matter in the water can be prevented.

Another problem of prior art water purification systems overcome by the water purification system according to the invention is the efficient removal of volatile gases produced during the purification process and the recovery of the inherent heat in the volatile gases. As seen in FIG. 2, the volatile gas conduit 114 extends between an outlet formed at the peak of the sloped primary heat exchange chamber 84 to an inlet in the outlet chamber 46 of the preheater. The inlet is preferably below the gravity feed tube outlet conduit 62 such that the gases entering the outlet chamber 46 enter below the water line during normal operating conditions. Preferably, the conduit 114 extends vertically above the point in which it is mounted to the outlet chamber 46. With this construction, as seen in FIG. 2, the back flow of water through the vent can be prevented in the event of malfunctioning of the system which results in a water level higher than the point in which the conduit 114 is mounted to the outlet chamber 46.

The volatile gases contained in the distillate steam inside the primary heat exchange chamber 84 typically have a boiling temperature below 212° F. Therefore, these gases will rise inside the primary heat exchange chamber 84 and will be forced out of the primary heat exchange chamber 84 as a result of the slight positive pressure in the chamber. Entrapped steam will also be forced through the volatile gas conduit 114 to the preheater 14. The volatile gases and entrapped steam will pass through the conduit 114 and enter the outlet chamber 46 of the preheater at a point which is below the water level of the heated source water contained in the outlet chamber 46. Therefore, the volatile gases and entrapped steam will percolate up through the source water to the air space at the top of the outlet chamber 46. As noted earlier, the temperature of the heated source water at this point in the system is approximately 216° F. Therefore, any steam which is entrapped within the flow of gases will revert to the liquid state and the volatile gases, which typically have a boiling point below 216° F., will remain in the vapor state and occupy the space above the water level in the outlet chamber 46. As a result of the pressure created by the source water pump 172 and the slight positive pressure in the primary heat exchange chamber 84, the volatile gases above the heated source water in the outlet chamber 46 will similarly be under a slight positive pressure. The volatile gas is collected in the outlet chamber 46 are vented from the system into a drain through a volatile gas outlet conduit 270.

A conventional valve 272 is mounted in the volatile gas outlet conduit 270 and is adapted to equalize the pressure between the primary heat exchange chamber 84 and the outlet chamber 46 of the preheater 14. The valve 272 will remain open to permit the exhausting of volatile gases provided that the water level within the outlet chamber 46 does not get too high. A vent sensor 274 is mounted to the side wall 34 of the preheater 14 below the opening for the volatile gas outlet conduit and is interconnected to the valve such that when the water level rises to the level such that it contacts the vent sensor 274, the valve 272 will be closed, thereby increasing the pressure inside the outlet chamber 46 as the steam and volatile gases are forced into the outlet chamber 46.

Preferably, the volatile gases are exhausted to a drain where they are combined and condensed with cooler wastewater which is drained from the base of the wastewater heat exchange chamber 60 through a conduit 278. This condensation process has the benefit of avoiding the exhaustion of hot, potentially volatile gases into the environment in which the distillation system is being operated.

The vent mechanism of the water purification system according to the invention also has the added benefit of recapturing some of the heat from the steam and volatile gases by forcing the gases through the source water in the outlet chamber 46. Therefore, rather than just exhausting these gases to the environment, some of the entrapped heat can be reused within the distillation system.

The water distillation system according to the invention is extremely efficient in that it recaptures and reutilizes a significant amount of heat generated through the transformation of water to steam. In addition, the distillation system according to the invention includes mechanisms to produce pure distilled water at a significantly lower cost as a result of the recycling and reusing of the inherent heat and the removal of impurities. Finally, the water distillation system according to the invention includes a compression rotor drive mechanism and assembly which dramatically simplifies the manufacturing and maintenance costs typically encountered in a compression system for hot gases.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

We claim:

1. An improved water distillation system comprising:

a preheater having a water chamber, a source water inlet in fluid communication with the water chamber for supplying water to the water chamber so that the water reaches a normal operating water level within the water chamber, a preheated water outlet in fluid communication with the water chamber and a heat exchanger provided therein wherein the preheater heats incoming source water;

an evaporator having a preheated water inlet, an evaporator chamber and a heat exchanger chamber mounted therein wherein the evaporator converts the preheated source water into water vapor and volatile gases;

the improvement comprising:

an evaporator volatile gas outlet formed in the heat exchanger chamber of the evaporator;

a preheater volatile gas inlet formed in the preheater, the gas inlet being located below the normal operating water level in the preheater; and a gas conduit having one end mounted to the evaporator volatile gas outlet and the other end mounted to the preheater volatile gas inlet to create a fluid conduit between the evaporator chamber and the preheater, the gas conduit having an intermediate portion thereof positioned between the evaporator volatile gas outlet and the preheater volatile gas inlet, the intermediate portion also being positioned vertically above the volatile gas inlet to prevent the backflow of water from the preheater to the evaporator;

whereby the gas and water vapor mixture exiting the evaporator and entering the preheater through the gas conduit is forced into solution with the water in the preheater so that the gas and water vapor mixture will give up at least a portion of its latent heat to the preheater water such that at least a portion of the water vapor reverts to the liquid state.

2. An improved water distillation system according to claim 1 and further comprising;

a preheater volatile gas outlet formed in the preheater above the preheated water outlet; and a volatile gas valve mounted to the preheater volatile gas outlet, the gas valve being selectively opened and closed to control the exhaust of volatile gases from the preheater.

3. An improved water distillation system according to claim 2 and further comprising a valve sensor mounted in the preheater intermediate the preheater volatile gas outlet and the preheated water outlet, the sensor being interconnected to the volatile gas valve for to selectively opening and closing the valve in response to the level of water in the preheater.

4. An improved water distillation system according to claim 2 and further comprising;

a drain;

a wastewater drain outlet formed in the evaporator to remove wastewater from the evaporator chamber;

a wastewater conduit extending from the wastewater drain outlet to the drain; and a volatile gas conduit extending from the volatile gas outlet to the drain;

whereby the volatile gas outlet of the preheater is in fluid communication with the drain such that the volatile gases passing through the outlet are combined with the wastewater and the gases are converted to the liquid state.

5. An improved water distillation system according to claim 1 and further comprising a compression rotor in fluid communication with the evaporation chamber and the heat exchanger, wherein the compression rotor compresses the water vapor and volatile gases emanating from the evaporation chamber and forces the compressed water vapor and gases into the heat exchanger thereby increasing the pressure within the heat exchanger which in turn forces volatile gases from the heat exchanger to the preheater through the gas conduit.

6. An improved water distillation system comprising:

a preheater having a water chamber, a source water inlet in fluid communication with the water chamber, a preheated water outlet in fluid communication with the water chamber and a heat exchanger provided therein wherein the preheater heats incoming source water; and an evaporator having a preheated water inlet, an evaporator chamber, and a heat exchanger chamber mounted therein wherein the evaporator converts the preheated source water into water vapor and volatile gases;

the improvement comprising:

an evaporator volatile gas outlet formed in the heat exchanger chamber of the evaporator;

a preheater volatile gas inlet formed in the preheater, the gas inlet being located below the water level in the preheater during normal operation of the distillation system;

a gas conduit having one end mounted to the evaporator volatile gas outlet and the other end mounted to the preheater volatile gas inlet to create a fluid conduit between the evaporator chamber and the preheater, the gas conduit prevent the backflow of water from the preheater to the evaporator;

a preheater volatile gas outlet formed in the preheater above the preheated water outlet for exhausting gases from the preheater; and a volatile gas valve mounted to the preheater gas outlet wherein the valve selectively opened and closed to control the exhaust of volatile gases from the preheater;

whereby the gas and water vapor mixture exiting the evaporator and entering the preheater through the gas conduit is forced into solution with the water in the preheater so that the gas and water vapor mixture will give up at least a portion of its latent heat to the preheater water such that at least a portion of the water vapor reverts to the liquid state and the volatile gases remaining in the preheater after being forced through the water can be removed from the preheater in a controlled manner through the volatile gas outlet and valve operation.

7. An improved water distillation system according to claim 6 and further comprising a valve sensor mounted in the preheater intermediate the preheater volatile gas outlet and the preheated water outlet, the sensor being interconnected to the volatile gas valve for selectively opening and closing the valve in response to the level of water in the preheater.

8. An improved water distillation system according to claim 6 and further comprising;

a drain;

a wastewater drain outlet formed in the evaporator to remove wastewater from the evaporator chamber;

a wastewater conduit extending from the wastewater drain outlet to the drain; and a volatile gas conduit extending from the volatile gas outlet to the drain;

whereby the volatile gas outlet of the preheater is in fluid communication with the drain such that the volatile gases passing through the outlet are combined with the wastewater and the gases are converted to the liquid state.

9. An improved water distillation system according to claim 6 and further comprising a compression rotor in fluid communication with the evaporation chamber and the heat exchanger, wherein the compression rotor compresses the water vapor and volatile gases emanating from the evaporation chamber and forces the compressed water vapor and gases into the heat exchanger thereby increasing the pressure within the heat exchanger which in turn forces volatile gases from the heat exchanger to the preheater through the gas conduit.

10. An improved water distillation system according to claim 6 wherein the gas conduit comprises an intermediate portion positioned between the evaporator volatile gas outlet and the preheater volatile gas inlet, the intermediate portion extending vertically above the water chamber of the preheater to prevent the backflow of water from the preheater to the evaporator.

11. An improved water distillation system comprising:

a preheater having a water chamber, a source water inlet in fluid communication with the water chamber, a preheated water outlet in fluid communication with the water chamber and a heat exchanger provided therein wherein the preheater heats incoming source water; and an evaporator having a preheated water inlet, an evaporated chamber and a heat exchanger chamber mounted therein wherein the evaporator converts the preheated source water vapor and volatile gases;

the improvement comprising;

an evaporator volatile gas inlet formed in the heat exchanger chamber of the evaporator;

a preheater volatile gas inlet formed in the preheater, the gas inlet being located below the water level in the preheater during normal operation of the distillation system;

a gas conduit having one end mounted to the evaporator volatile gas outlet and the other end mounted to the preheater volatile gas inlet to create a fluid conduit between the evaporator chamber and the preheater;

a preheater volatile gas outlet formed in the preheater above the preheated water outlet;

a drain;

a wastewater drain outlet formed in the evaporator to remove wastewater from the evaporator chamber;

a wastewater conduit extending from the wastewater drain outlet to the drain; and a volatile gas conduit extending from the volatile gas outlet to the drain;

whereby the volatile gas outlet of the preheater is in fluid communication with the drain so that the volatile gases passing through the outlet are combined with the wastewater and the gases are converted to the liquid state rather than being released into the atmosphere.

12. An improved water distillation system according to claim 11 and further comprising a volatile gas valve mounted to the preheater volatile gas outlet, the gas valve being selectively opened and closed to control the exhaust of volatile gases from the preheater.

13. An improved water distillation system according to claim 12 and further comprising a valve sensor mounted in the preheater intermediate the preheater volatile gas outlet and the preheated water outlet, the sensor being interconnected to the volatile gas valve for selectively opening and closing the valve in response to the level of water in the preheater.

14. An improved water distillation system according to claim 11 and further comprising a compression rotor in fluid communication with the evaporation chamber and the heat exchanger, wherein the compression rotor compresses the water vapor and volatile gases emanating from the evaporation chamber and forces the compressed water vapor and gases into the heat exchanger thereby increasing the pressure within the heat exchanger which in turn forces volatile gases from the heat exchanger to the preheater through the gas conduit.

* * * * *

UNITED STATES PATENT AND TRADEMARK OFFICE
CERTIFICATE OF CORRECTION

PATENT NO.   : 5,599,429
DATED        : February 4, 1997
INVENTOR(S)  : DAVID L. MARTIN and ROBERT C. MARTIN It is certified that error appears in the above-indentified patent and that said Letters Patent is hereby corrected as shown below:

Column 14, claim 3, line 53:
    After "for" delete --to--.

Column 15, claim 6, line 15:
    After "chamber" and before the comma, insert --with a normal operating water level--.

Column 15, claim 6, line 41;
    After "valve" insert --is--.

Column 16, claim 11, line 36:
    After "water" insert --into water--.

Column 16, claim 11, line 38:
    Delete "inlet" and substitute therefor --outlet--.

Signed and Sealed this

Twenty-second Day of July, 1997

Attest:

BRUCE LEHMAN

*Attesting Officer*      *Commissioner of Patents and Trademarks*